July 11, 1961 E. KORF 2,991,692
FILTER DEVICES FOR ENLARGING APPARATUS
Filed Nov. 15, 1957
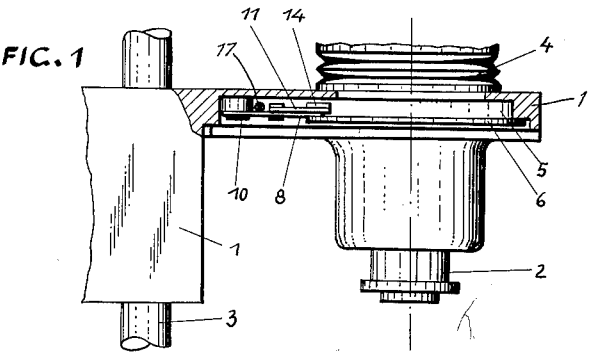
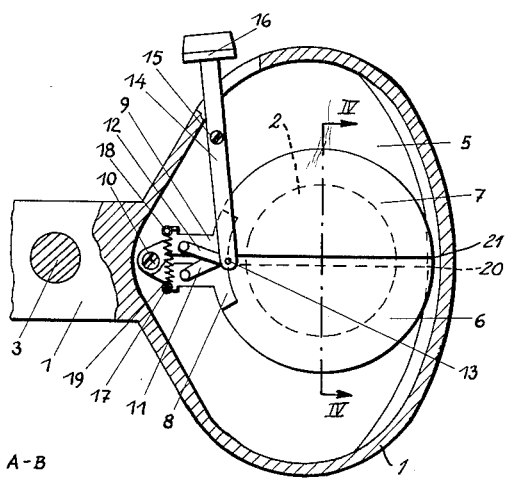
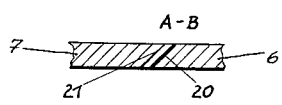
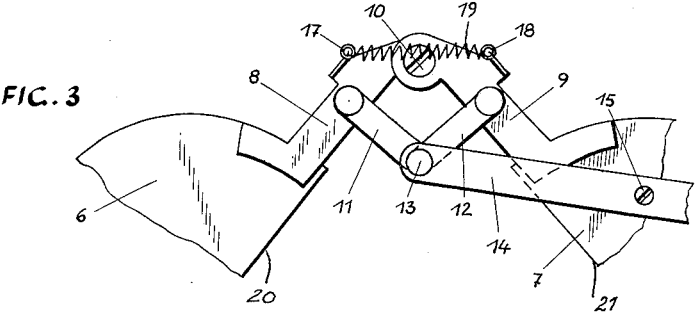
INVENTOR.
Erich Korf United States Patent Office 2,991,692
Patented July 11, 1961

2,991,692
FILTER DEVICES FOR ENLARGING APPARATUS
Erich Korf, Dresden, Germany, assignor to VEB Kamera- und Kinowerke Dresden
Filed Nov. 15, 1957, Ser. No. 696,761
Claims priority, application Germany Jan. 7, 1957
5 Claims. (Cl. 88—24)

This invention relates to filter devices, particularly red filters for use in enlarging systems.

The employment of filters for enlarging and printing devices is known. When colored copies are to be enlarged or printed, color filters serve for changing the spectral combination of the printing light, necessary when the colored negatives or lantern slides show a predominant color which can be eliminated only by means of corrective filters. In case of black and white and colored negatives the exposure time for the different enlarging conditions can be kept constant by using gray filters of various density. When, however, red filters are employed in the darkroom, they are inserted in the ray path of the enlarging system to make possible and to control the proper focussing for enlarging and printing with respect to size, image distribution and if necessary also sharp focussing, without influencing the light-sensitive layer of the paper or film.

In known arrangements the color filters have, as a rule, the form of a round, rectangular or polygonal disc corresponding in size to that of the negative. The filters for spectrally altering the light are by preference placed between the lenses of the condensor system or between the latter and the negative film, so as not to affect sharp focussing, whereas a red filter is usually placed between the film and the lens or beneath the latter, so as to permit movement into and out of the ray path.

For this purpose the filters possess either a holder immovably connected with them or slidably disposed, or a special guide, and their movement is directly controlled by hand or by special cam discs. Although these filters differ in arrangement, design and mode of operation they nevertheless are similar in that the entire filter disc must be moved into and out of the ray path or into and out of the range of the negative to be enlarged. The drawback of this arrangement, is however, that the movement to be performed by the entire disc is relatively long and requires much space which, particularly in a design where the filters are located inside the lamp house or lens carrier, necessitates large dimensions which interfere with both the working procedure and the servicing. When the arrangement is such that the filter is placed outside the enlarging system, dust may collect thereon and detrimentally affect its operation while the filter itself can be damaged by scratching during the required frequent cleaning. Furthermore, this arrangement permits lateral light rays to emerge which will act as harmful secondary light when red light is used.

According to the invention, these disadvantages are avoided by the use of a filter system positioned in a closed widening of the lens carrier, the filter consisting of several parts, for instance of two pin-jointed members, which by a scissorlike lever system are so connected that when in their inoperative position they clear the ray path, but can be moved from both sides to the center of the optical axis and thus form a unitary filter for the ray path. The abutting edges of the two filter members, which extend in radial direction and touch each other in the operative position, are bevelled and overlap each other to form a connection without a gap. Both filter members are subject to the action of a spring which is so provided on them that the two members are positively arrested both in their inoperative and operative end positions.

The construction of the filter device according to the invention saves much space, shortens travel and ensures rapid movement of the filter into and out of the ray path of the enlarging system and simultaneously arrests both filter members in the operative or inoperative positions. The small space required affords the further advantage that the filter placed within the lens carrier is protected from all sides so that its operation is not hindered, detrimenal dust collection and the appearance of harmful secondary light are prevented.

One embodiment of the invention is diagrammatically shown in the accompanying drawings which show only the parts necessary for understanding the invention, and in which:

FIGURE 1 is a side view, partly in section, of the filter arrangement;

FIG. 2 is a top view thereof, partly in section;

FIG. 3 is an enlarged top view detail; and

FIG. 4 is a section through the filter members on the line IV—IV of FIG. 2.

Referring to the drawings, 1 is the carrier for a lens 2, guided by a column 3 for vertical sharp focussing movement. The column is secured to the support of the lighting system, not shown; the film support of the lighting system is connected to the lens carrier 1 in a light-tight manner by means of bellows 4. The widening 5 of the lens carrier 1 is suitably closed on all sides and accommodates the filter device comprising two filter members 6, 7 disposed on two holders 8, 9 and both turnable about a fulcrum 10. By means of joints a link 11 is connected with the holder 8 and a link 12 with the holder 9, and both links are connected at a fulcrum 13 to a control lever 14 which is movable about a fulcrum 15 positioned on the carrier 1 and is provided with a handle 16. The two holders 8, 9 are fitted on their sides with pins 17, 18 to which a tensioned spring 19 is attached. The two pins 17, 18 and the spring 19 are arranged so that spring 19, by swinging over the dead center at 10 upon movement of the two filter members 6, 7 selectively arrests the filter members in either the closed or the opened position, as shown in FIG. 2 and FIG. 3, respectively.

The mode of operation is as follows:

Assumed the filter has been effectively moved into the ray path in which position the various parts are arranged as shown in FIG. 2. The two filter members 6, 7, due to the action of spring 19, abut and form a unitary filter disc in the path of rays. Both filter members 6, 7 are bevelled at their respective contacting edges 20, 21 and held together to exclude gaps (FIG. 4). The two filter members 6, 7 are moved into and out of the ray path by the control lever 14. When this lever moves in one direction, the links 11, 12, which are connected with it at the common fulcrum 13 and the film members 6, 8 and 7, 9 are spread apart, moved out of range of the ray path and held in this position by the action of spring 19, as shown in FIG. 3. At movement of the lever in opposite direction, the two filter members 6, 8 and 7, 9 are moved by the links 11, 12 into the path of rays until they abut and are positively held in this position by the spring 19.

I claim:

1. A filter device for a photographic enlarging apparatus having a housing and a lens carrier including a lens mounted thereon, comprising a first and a second filter plate pivotally mounted in said housing, said filter plates being co-planar and capable of passing identical limited spectrums of radiation in the direction of the optical axis of said lens, a bevelled edge on each of said filter plates, said edges being shaped for mutual abutment so as to present a continuous filter surface from said first to said second filter plate, a first and a second arm at respective edges of said filter plates for pivotally mounting said plates, a fulcrum connecting both of said arms to said housing, a first and a second link pivotally mounted on the respective arms of said filter plates, resilient means comprising a spring secured to said arms for arresting said arms in an engaged and a disengaged position, said resilient means being arranged to swing over said fulcrum to provide stable conditions of said filter plates, and a lever engaging said links and adapted to swing said arms from said engaged to said disengaged position and vice versa.

2. A filter device for a photographic enlarging apparatus having a housing and a lens carrier including a lens mounted thereon, comprising a first and a second filter plate pivotally mounted in said housing, said filter plates being co-planar and capable of passing identical limited spectrums of radiation in the direction of the path of rays passing through said lens, a bevelled edge on each of said filter plates, said edges being shaped for mutual abutment so as to present a continuous filter surface from said first to said second filter plate, a first and a second arm at respective edges of said filter plates for pivotally mounting said plates, a fulcrum connecting both of said arms to said housing, a first and a second link pivotally mounted on the respective arms of said filter plates, resilient means secured to said first and said second filter plates for selectively retaining said plates in a duality of pivotal positions, and a lever engaging said links for swinging said filter plates from one to the other of said pivotal positions and vice versa, wherein said continuous filter surface lies substantially within said path of rays, into the other of said positions, wherein said filter plates substantially clear said path of rays.

3. A photographic enlarging apparatus having a lens, a lamp housing positioned along the optical axis of said lens and adapted to allow light to pass to said lens, a filter device in said housing capable of selectively passing red rays upon receiving said light, said device including a pair of co-planar semi-circular filter plates having substantially diametric edges capable of mutual engagement; pivot means positioned in said housing along the diameters of said plates and outside the peripheries of said plates for pivotal movement of each of said plates into and out of abutting engagement with the other plate; said edges being beveled at angles supplementary to each other so as to provide a continuous gap-free filter surface with respect to light transverse to said filter device, and bistable means connected to said pivot means and including a member protruding from said housing for selectively moving and holding each of said filter plates in and out of engagement.

4. A photographic enlarging apparatus as set forth in claim 3 wherein said pivot means include a pair of arms each secured to one of said plates and a pivot shaft rotatably supporting both of said arms, and wherein said bistable means include a tensioned spring connected to both of said arms for urging said arms together into a first position wherein said plates are engaged with each other, said spring being capable of passing over said pivot shaft when said plates are disengaged, whereby said spring urges said arms apart to a second position, a lever pivotally mounted in and extending out of said housing, and a pair of divergent toggle members each connected to the end of said lever inside said housing and also connected to one of said arms for selectively engaging and disengaging said filter plates by movement imparted by said lever.

5. A photographic enlarging apparatus comprising an objective lens, a lamp housing adapted to pass light to said lens, a filter device in said housing capable of selectively passing a limited spectrum of light, said device including a pair of co-planar filter segments of substantially equal size, each segment having an edge passing through the center of said filter device and capable of mutual engagement with the other edge each of said edges being bevelled along their area of engagement at angles supplementary to each other so as to provide a continuous slit-free filter surface with respect to the light passing through said filter device, and means for moving said segments within said housing to positions, in one of which said edges are in mutual engagement while in the other they are disengaged and light may pass between said filter segments, said means comprising a biasing member adapted selectively to swing said filter segments into the mutually engaging or the disengaged positions.

References Cited in the file of this patent

UNITED STATES PATENTS

| | | |
|---|---|---|
| 340,213 | Hoedemaker et al. | Apr. 20, 1886 |
| 727,524 | Willsie | May 5, 1903 |
| 1,024,242 | Atherton | Apr. 23, 1912 |
| 1,127,763 | Howland | Feb. 9, 1915 |
| 1,398,952 | Tessier | Nov. 29, 1921 |
| 1,721,411 | Ramsey | July 16, 1929 |
| 1,766,637 | Hopewell | June 24, 1930 |
| 1,878,857 | Kitroser | Sept. 20, 1932 |
| 1,887,654 | Mahon | Nov. 15, 1932 |
| 2,291,347 | Ryan | July 28, 1942 |
| 2,460,507 | Johnston | Feb. 1, 1949 |